3,135,773
11,18,21-TRIOXYGENATED 20-OXO-PREGNANES AND ESTERS THEREOF AND PROCESS FOR THEIR MANUFACTURE
Albert Wettstein and Julius Schmidlin, Basel, Switzerland, assignors to Ciba Corporation, a corporation of Delaware
No Drawing. Filed Aug. 26, 1960, Ser. No. 52,049
Claims priority, application Switzerland Aug. 28, 1959
2 Claims. (Cl. 260—397.45)

The present invention provides a process for the manufacture of saturated and unsaturated 3-oxygenated 20-oxo-pregnane compounds that contain in each of the positions 11 and 18 a free or esterified hydroxyl or oxo group and in position 21 a free or esterified hydroxyl group, more especially those which contain in position 3 a free or esterified hydroxyl group or an oxo group and a double bond starting from carbon atom 5.

There may be mentioned more especially: the 18-hydroxy-corticosterone and 18-hydroxy-11-dehydro-corticosterone, further esters of saturated and unsaturated $11\beta:18:21$-trihydroxy-20-oxo-pregnanes or their 20-cyclo-semiketals which contain in the 3-position a free or esterified hydroxyl group or oxo group, particularly those of $\Delta^4$-3:20-dioxo-$11\beta:18:21$-trihydroxy-pregnene, for example 18- and 21-monoesters, 18:21-diesters, $11\beta:21$-diesters, $11\beta:18:21$-triesters and their ketals, for example 20-mono- and 3:20-bis-ketals with a lower aliphatic bivalent alcohol, also 20:21-diesters which are derived from the 20-cyclosemiketal of the above mentioned 3:20-dioxo compound, and esters of saturated or unsaturated 18:21-dihydroxy-11:20-dioxo-pregnanes or their 20-semiketals which contain in the 3-position a free or esterified hydroxyl group or an oxo group, especially those of $\Delta^4$-3:11:20-trioxo-18:21-dihydroxy-pregnene, for example 18:21-diesters, 18- or 21-monoesters and their lower alkylene ketals, for example ethylenedioxy derivatives, and 20:21-diesters which are derived from the 20-cyclosemiketal of the above named 3:11:20-trioxo compound, and esters of saturated and unsaturated $11\beta:21$-dihydroxy-18:20-dioxo-pregnanes with the designated substituent in the 3-position, particularly of $\Delta^4$-3:18:20-trioxo-$11\beta:21$-dihydroxy-pregnene, for example 21-monoesters and corresponding derivatives with an oxo group in the 11-position and their lower alkylene ketals. In these esters the acyl groups are radicals of aliphatic, alicyclic, araliphatic, aromatic or hererocyclic carboxylic acids, thioncarboxylic acids or thiolcarboxylic acids, advantageously of carboxylic acids with 1 to 20 carbon atoms, especially lower molecular aliphatic carboxylic acids, such as, for example, formic acid, acetic acid, chloracetic aid, trifluoracetic acid, propionic acid, trimethylacetic acid, carbonic acid, oxalic acid, succinic acid and the like, or monocyclic aromatic carboxylic acids, such as benzoic acid, phthalic acids, salicyclic acid and the like, or monocyclic cycloaliphatic acids such as cyclopropanecarboxylic aids, cyclobutane-carboxylic acids, monocyclic aromatic lower aliphatic carboxylic acids such as, for example, phenylacetic acid, phenylpropionic acid and the like.

Suitable starting materials for the manufacture of the afore-mentioned steroids are, for example, the 20-ketals of appropriately substituted $11\beta:18:21$-trihydroxy-20-oxo-pregnenes which are readily obtainable by the process described in U.S. patent application Serial No. 845,095, filed October 8, 1959, by Albert Wettstein et al. from $(18\rightarrow 11\beta)$-lactones of suitable $11\beta:21$-dihydroxy-20-oxo-pregnene-18-acids by ketalization and subsequent reduction with a complex metal hydride. All that is needed to convert the resulting reduction product into the desired final product is to liberate the ketalized oxo group in the 20-position. It is, however, remarkable that it is impossible by conventional methods to bring about deketalization in the desired manner, that is to say with retention of all three oxygen functions in positions 11, 18 and 21, with the hydrolysis yielding the 20-oxo group.

The aforementioned difficulties are due to the special structure of the ketal to be split, in which the vicinal hydroxyl groups have a strong tendency to undergoing intramolecular cleavage reactions. Thus, for example, acid hydrolysis of the 3:20-diketal of $\Delta^5$-3:20-dioxo-$11\beta:18:21$-trihydroxy-pregnene produces even when a weak acid such as acetic acid is used almost exclusively the $\Delta^4$-3:20-dioxo-$11\beta:18$-oxido-21-hydroxy-pregnene, or its 21-O-acetyl derivative respectively, accompanied by the elimination of water. It can be shown that an analogous anhydration occurs under certain reaction conditions between the 18-hydroxyl and 21-hydroxyl functions.

Taking account of these experiences it was an obvious step to attempt to mask hydroxyl groups, more especially those in positions 18 and 21, so as to render them fast to acids. However, such a step as an intermediate protection of the oxygen functions to be formed did not seem very promising on closer examination, since ester radicals as groups that are easy to eliminate, generally promote elimination reactions. In addition it was known that in general 20-ketals of 21-acryloxy-20-keto-pregnanes are very difficult to hydrolyse and that energetic conditions must be employed which, in their application to the delicate substance with which we are here concerned, give rise to the said side reactions. A specific exception in this connection are the 3:20-diketals of 21-acetyl-aldosterone and of 18:21-diacetyl-aldosterone which, as described in U.S. patent application Ser. No. 770,006, filed October 28, 1958, now Pat. No. 3,014,904, by Tadeus Reichstein et al. can be readily hydrolysed with boiling acetic acid of 90% strength to yield 21-acetyl-aldosterone. It is, however, remarkable that under the conditions described above 20-ketals of esters of $11\beta:18:21$-trihydroxy-20-oxo-pregnanes cannot, or at best with a poor yield, be hydrolysed as desired to yield free 20-oxosteroids.

Contrary to all expectations, it has been found that for the successful hydrolysis of the 20-ketal group the intermediate esterification for the preparation of the aforementioned $11:18:21$-trihydroxy-20-oxo-pregnenes is especially advantageous. The present process consists in esterifying at least one of the hydroxyl groups in a 20-ketal of a saturated or unsaturated 3-oxygenated $11:18:21$-trihydroxy-20-oxo-pregnane, hydroylsing the ketal group in the 20-position by reaction with a strong inorganic acid in the presence of an aliphatic carboxylic acid of low molecular weight, if desired dehydrogenating before or after the ketal cleavage at least one of the remaining free hydroxyl groups, and, if desired, hydrolysing ester groups and/or esterifying free hydroxyl groups.

Some of the products of the process are new and are therapeutically valuable compounds having a mineralocorticoid activity. They may be used, for example for the treatment of Addison's disease, states of shock and asthenia. Special mention must be made of the highly active mineralocorticoid 18-hydroxy-corticosterone and its esters, and 18-hydroxy-11-dehydro-corticosterone and its esters. In addition, the compounds obtained by the present process may be used as starting materials for the manufacture of other 18-oxygenated corticosteroids having adrenocortical hormone activity.

The esters used as intermediates contain at least one esterified hydroxyl group, preferably in position 21 and if desired also oxo groups in positions 11 and 18. They are made from appropriate 11:18:21-trihydroxy-20-oxo-pregnane compounds by treatment with carboxylic acid anhydrides or halides, preferably in the presence of an acid binding agent, for example of a tertiary base, and if desired subsequent selective or total dehydrogenation of any free hydroxyl groups to oxo groups by a known method. Suitable esterification agents are simple and mixed anhydrides or halides of the above mentioned acids; for the present process it is of advantage to use those of lower molecular aliphatic carboxylic acids, such as for example formic acid, acetic acid, chloracetic acid, trifluoracetic acid, propionic acid, trimethyl-acetic acid, carbonic acid, oxalic acid or succinic acid.

The hydrolysis according to the invention of the ketal radical in the 20-position is advantageously performed under conditions that ensure that ester groups, more especially those in position 18 or 11 respectively, remain intact. Particularly suitable for this purpose are strong inorganic acids, such as perchloric acid, in admixture with a lower aliphatic carboxylic acid, such as formic acid, acetic acid, chloracetic acid, trifluoracetic acid, propionic acid or trimethylacetic acid, and the process is performed with special advantage with a mixture of the carboxylic acid present in the ester component and preferably at a temperature ranging from $-20°$ to $+40°$ C. Additionally present ketal radicals, for example in the 3-position, are simultaneously hydrolysed by this reaction.

If desired, any free hydroxyl groups present can be dehydrogenated selectively or totally to the oxo stage, before or after the de-ketalization, by a known method, for example with the aid of a compound of hexavalent chromium, such as chromic oxide in pyridine or acetic acid, or with tertiary butyl chromate in carbon tetrachloride. It is inter alia possible, for example, to dehydrogenate the 11$\beta$-hydroxyl group in an 11$\beta$:18-dihydroxy-21-acyloxy-pregnane selectively with the aid of a stoichiometric amount of chromium trioxide/pyridine complex, while when an excess of oxidant is used and the reaction time is extended, the corresponding 11:18-dioxo-pregnanes are readily formed.

Ester groups contained in the resulting 20-oxo-pregnanes, or if desired in the afore-mentioned dehydrogenation products, can be liberated completely or selectively by alkaline hydrolysis. Thus, for example, the reaction of an alkali metal bicarbonate with an 11-oxygenated 18:21-diacetoxy-20-oxo-pregnane in an aqueous alcohol gives a practically quantitative yield of 18-acetoxy-pregnanes containing a free ketol side-chain. The hydrolysis of the 18-acetoxy group, and if desired of the 11-acetoxy group, is advantageously carried out with a strong alkali, for example with a carbonate or alcoholate of an alkali metal. Another method suitable for liberating the blocked hydroxyl groups is catalytic transesterification, which is performed with special advantage by treatment with an alkali metal cyanide in an anhydrous alcohol.

The subsequent esterification of free hydroxyl groups in a resulting compound can be carried out with the same measures as have been described above for use in the first stage of the process and the acids mentioned above may be used for this purpose.

The invention also includes any variant of the process in which an intermediate obtained at any stage of the process is used as starting material and the remaining step or steps is/are carried out, or the process is terminated at any stage thereof, or in which the starting materials are formed under the reaction conditions.

The new compounds can be used as medicaments in human and veterinary medicine, for example in the form of pharmaceutical preparations which contain the active substance in admixture with a pharmaceutical organic or inorganic, solid or liquid carrier suitable for enteral or parenteral administration. As carriers such substances come into consideration as do not react with the new compounds, such as for instance water, gelatine, lactose, starch, magnesium stearate, talc, vegetable oils, benzyl-alcohols, gums, polyalkylene glycols, cholesterol or other known carriers. The pharmaceutical preparations can be in the form, for instance, of tablets or dragees or in liquid form as solutions, suspensions or emulsions. They may be sterilized and/or contain auxiliary substances, such as preserving, stabilizing, wetting or emulsifying agents, salts for the modification of osmotic pressure or buffers. They may also contain other therapeutically useful substances. The preparations are obtained in the customary way. The content of active substance in these preparations, such as in an ampoule, is preferably 0.1–200 mg., or 0.03–60%.

The following examples illustrate the invention:

*Example 1*

A solution of 1.088 grams of d:l-$\Delta^5$-3:3;20:20-bis-ethylenedioxy-11$\beta$:18:21-trihydroxy-pregnene in 50 cc. of a mixture of molecular proportions of acetanhydride and pyridine in anhydrous tetrahydrofuran is kept for 96 hours in the dark at room temperature while being occasionally agitated. The reaction mixture is then concentrated in a water-jet vacuum to a volume of about 5 cc., the residual reagents and the acetic acid formed are removed by portionwise evaporation of a total of 100 cc. of anhydrous toluene in an oil-pump vacuum with the aid of methylene chloride as solution promoter, and the whole is evaporated, and yields from ether 1.176 grams of an almost colorless, practically wholly crystalline crude product. The latter is dissolved in 24 cc. of methylene chloride, and the solution is chromatographed "down to the bottom" on 240 sheets of whatman paper No. 1 (size: 18.5 x 45 cm.), saturated with formamide, in the system formamide/cyclohexane-benzene (4:1). The sheets are dried for 22 hours in an aerated smoke cupboard, the zone of $R_f$ value 0.48 to 0.68 is then cut out, the formamide retained by the paper is removed by drying for 16 hours at 40° C. in a high vacuum, and the paper is successively eluted with a total of 1780 cc. of aqueous tetrahydrofuran of 20% strength, 520 cc. of 50% strength, and with 260 cc. of undiluted tetrahydrofuran. The combined extracts are concentrated in vacuo to a volume of about 40 cc., and the aqueous residue is exhaustively extracted with benzene. The benzolic extracts are washed with a small amount of 2.5-molar sodium chloride solution, dried with sodium sulphate and evaporated, to yield a pale-yellow residue which crystallises from a small amount of ether. Yield: 308.6 mg. of colorless crystals melting at 159–162° C. The mother liquor yields another 26 mg. of slightly less pure crystals melting at 152.5–159° C. The first crystalline fraction is dissolved in benzene, filtered through a column of 306 mg. of Norite, again crystallized from ether with the use of methylene chloride as solution promoter, and yields in this manner 216.4 mg. of d:l-$\Delta^5$-3:3;20:20 - bisethylenedioxy - 11$\beta$ - hydroxy - 18:21 - diacetoxy-pregnene melting at 162–163.5° C.

107 mg. of d:l-$\Delta^5$-3:3;20:20 - bisethylenedioxy - 11$\beta$-hydroxy-18:21-diacetoxy-pregnene are covered with 4 cc. of a mixture of glacial acetic acid and perchloric acid dihydrate (the mixture containing a molecular proportion of the latter), and the whole is stirred for 10 minutes at room temperature. While applying slight external cooling, the reaction mixture is then treated with 5 cc. of a molar solution of potassium acetate in glacial acetic acid, and the acetic acid is removed almost completely by means of an oil pump. The residue is diluted with water and extracted with methylene chloride, the extract is washed with ice-cold 0.5 N-sodium bicarbonate solution and with 2.5-molar sodium chloride solution, dried with sodium sulphate and evaporated. The de-ketalization product crystallises from ether at first partially in spherical clusters of fine needles which, on being allowed to stand for several hours, turn into glass-clear, coarse blocks. The coarse crystals of the main product are easy to separate mechanically from a small amount (2 to 3 mg.) of a finely crystalline high-melting by-product which, on being left to itself for some time, likewise crystallises. In this manner there are obtained 73.4 mg. of d:l-$\Delta^4$-3:20-dioxo-11$\beta$-hydroxy - 18:21 - diacetoxy-pregnene melting at 184.5–187.5° C.

24.5 mg. of d:l-$\Delta^4$-3,20-dioxo-11$\beta$-hydroxy-18:21-diacetoxy-pregnene are shaken with 2.76 cc. of a 0.1 N-solution of potassium bicarbonate in aqueous methanol of 80% strength for 1 hour in the dark, whereupon the starting material passes completely into solution. The reaction mixture is kept for another 7 hours at room temperature, the alkali is neutralized by adding 2.2 cc. of 0.1 N-acetic acid, and the solution is concentrated in vacuo to a volume of about 1 cc. The aqueous residue is saturated with sodium chloride and exhaustively extracted with benzene. The benzolic extracts are washed with a small amount of 4-molar sodium chloride solution, combined, dried with sodium sulphate, and the solution is evaporated in vacuo. The residue is dissolved in 1.2 cc. of methylene chloride and chromatographed at 38° "down to the bottom" on 12 sheets of whatman paper No. 1 (size: 18.5 x 45 cm.; previously washed with chloroform and methanol) in the system B1$_1$ according to Bush. The sheets are then cut up, and the main zone of $R_f$=0.32 to 0.44 is eluted with a total of 225 cc. of methanol; the extract is evaporated to dryness in vacuo at room temperature, and the residue which forms a thin layer is shaken for 6 minutes each with 10 cc. and 5 cc. and then 4 times each for 3 minutes with 2.5 cc. of benzene. The benzolic extracts are collected and concentrated in vacuo to a volume of about 5 cc., and then cleared by filtration through a short column of cotton wool. The clear filtrate is evaporated in vacuo and leaves an amorphous residue which yields from a small amount of ethyl acetate 10.6 mg. of pure d:l-$\Delta^4$-3:20-dioxo-11$\beta$:21-dihydroxy-18-acetoxy-pregnene melting at 97.5–100° C.

10.1 mg. of d:l-$\Delta^4$-3:20-dioxo - 11$\beta$:21 - dihydroxy-18-acetoxy-pregnene are covered under nitrogen with 1 cc. of a 0.1 N-solution of potassium carbonate in aqueous methanol of 80% strength, and the whole is shaken with exclusion of air for 15 minutes. The resulting solution is cooled in an ice-water mixture, a little piece of solid carbon dioxide of the size of a grain of millet is added, and the mixture is evaporated in vacuo at room temperature. The residue is mixed with 250 mg. of sodium sulphate and shaken with 2.5 cc. and then 7 more times with 0.5 cc. each of tetrahydrofuran. The extracts are filtered through a short column of cottonwool, and the clear filtrate is concentrated in vacuo to a volume of about 0.1 cc. On diluting the solution with ether, there are obtained 5.35 mg. of d:l-$\Delta^4$-3:20-dioxo-11$\beta$:18:21-trihydroxy-pregnene, or its 20-cyclosemiketal respectively, melting at 174–176.5° C.

3.0 mg. of the above described d:l-$\Delta^4$-3:20-dioxo-11$\beta$:21-dihydroxy - 18 - acetoxy-pregnene are acetylated with 0.075 cc. of acetic anhydride and 0.035 cc. of pyridine for 14 hours at 25° C. The reaction mixture is then evaporated in a high vacuum with the addition of a total of 0.3 cc. of toluene, and the entraining agent retained is removed by taking up the residue repeatedly in a mixture of methylene chloride and ether and evaporation in vacuo. The amorphous crude product is crystallized from a mixture of tetrahydrofuran and ether. As first fraction there are obtained 2.2 mg. of d:l-$\Delta^4$ - 3:20 - dioxo - 11$\beta$-hydroxy - 18:21 - diacetoxy - pregnene melting at 186.5–189° C., and on being left to stand there is obtained from the concentrated mother liquor another 0.95 mg. of crystals of the same compound melting at 184.5–188° C.

11.15 mg. of d:l-$\Delta^4$-3:20-dioxo - 11$\beta$ - hydroxy - 18:21-diacetoxy-pregnene are covered in a nitrogen atmosphere with 1.0 cc. of an 0.1 N-solution of potassium carbonate in aqueous methanol of 80% strength and the whole is agitated for 20 minutes at 20° C. with the exclusion of air. The resulting solution is then treated at 0–3° C. with 1.0 cc. of 0.05 N-acetic acid, the mixture concentrated in a high vacuum to a volume of about 0.1 cc. and, after adding 250 mg. of sodium sulphate to the residue, it is extracted with a total amount of 7.5 cc. of chloroform. The extract is filtered through a short column of cottonwool to give a clear filtrate which, on being evaporated in vacuo, leaves a clear syrup which crystallizes after being taken up in a little ether. There are obtained 8.55 mg. of d:l-$\Delta^4$-3:20-dioxo-11$\beta$:18:21-trihydroxy-pregnene or its 20-cyclo-semiketal melting at 168–172° C. (only partially melting with gradual conversion into a material not yet melting at 260° C.).

18.1 mg. of d:l-$\Delta^4$-3:20-dioxo - 11$\beta$:18:21 - trihydroxy-pregnene or its 20-cyclo-semiketal are dissolved in 0.90 cc. of a previously prepared mixture (1:1) of acetic acid anhydride and pyridine. After being allowed to stand for 1 hour at 25° C. the reaction mass is evaporated completely in a high vacuum using toluene as entraining agent, and the solid residue recrystallized from a mixture of chloroform and ether. As first fraction there are obtained 18.7 mg. of d:l-$\Delta^4$-3:20-dioxo-11$\beta$:18-dihydroxy-21-acetoxy-pregnene or its 20-cyclosemiketal melting at 175.5–188° C. and from the mother liquor another 0.2 mg. melting at 173.5–179.5° C.

1.0 mg. of d:l-$\Delta^4$-3:20-dioxo-11$\beta$:18-dihydroxy-21-acetoxy-pregnene or its 20-cyclosemiketal is covered with 0.10 cc. of an 0.1 N-solution of potassium carbonate in aqueous methanol of 80% strength and the mixture is agitated at 25° C. for 20 minutes. The resulting solution is then treated at 0–3° C. with 0.10 cc. of 0.05 N-acetic acid and evaporated almost to dryness in a high vacuum. After adding 25 mg. of sodium sulphate the residue is extracted with a total of 0.75 cc. of chloroform and the filtered extracts evaporated to yield a colorless lacquer which is taken up in a little ether and becomes almost completely solid on the solvent being slowly evaporated. On the basis of the paper chromatographic analysis in the solvent systems formamide/chloroform and formamide/butyl acetate-water (20:1) the resulting material is found to consist to about 90% of the above described d:l-$\Delta^4$-3:20 - dioxo - 11$\beta$:18:21 - trihydroxy - pregnene or its 20-cyclosemiketal.

A solution of 36.3 mg. of d:l-$\Delta^4$-3:20-dioxo-11$\beta$:18:21-trihydroxy-pregnene or its 20-cyclosemiketal in 0.82 cc. of anhydrous pyridine and 0.96 cc. of acetic anhydride is allowed to stand for 86 hours at room temperature. The reaction mixture is then evaporated in a high vacuum using toluene as entraining agent, the crude product dissolved in 4.0 cc. of chloroform is applied to 40 sheets of whatman paper No. 1 saturated with formamide (size: 18.5 x 45 cm.; previously washed with chloroform and methanol) and allowed to run "down to the bottom" with benzene as mobile phase. After drying the sheets for 20 hour in an aerated smoke cupboard the ultraviolet-absorbing zone of $R_f$-value 0.60–0.70 is cut out and worked up as described in the first paragraph of this example. In this manner there is obtained pure d:l-$\Delta^4$-3-oxo-11$\beta$-hydroxy - 18:20 - oxido - 20:21 - diacetoxy-pregnene. By elution of the ultraviolet-absorbing zone of $R_f$-value 0.50–0.58 of the chromatogram carried out in an analogous manner there is obtained pure d:l-$\Delta^4$-3:20-dioxo-11$\beta$-hydroxy-18:21-diacetoxy-pregnene (cf. above).

*Example 2*

A solution of 267.3 mg. of d:l-$\Delta^5$-3:3;20:20-bisethylenedioxy-11$\beta$-hydroxy-18:21-diacetoxy-pregnene in 7.0 cc. of pyridine is treated with stirring within 5 minutes with 5.5 cc. of a 0.1-molar solution of chromic oxide in pyridine, and the whole is stirred for 22 hours at room temperature. The reaction mixture is then evaporated almost to dryness in an oil-pump vacuum, the semi-solid residue is repeatedly extracted by being stirred with a total of 35 cc. of methylene chloride, and the extract is filtered through a layer of 0.5 gram of kieselguhr. The filtrate is washed ice-cold with 2-molar phosphoric acid, 0.5 N-sodium bicarbonate solution and water, dried with sodium sulphate and evaporated in vacuo, to yield a dark-brown crude product which is dissolved in 10 cc. of benzene; the solution is filtered through a column of 250 mg. of active carbon, and the practically colorless filtrate is chromatographed at 38° "down to the bottom" on 150 sheets of whatman paper No. 1 (size: 18.5 x 45 cm.; previously washed with chloroform and methanol) in the system A according to Bush. The zone of $R_f=$ 0.30 to 0.48 is successively eluted with 1250 cc. of aqueous tetrahydrofuran of 20% strength, 500 cc. of 50% strength and with 250 cc. of undiluted tetrahydrofuran, the aqueous extracts are freed from tetrahydrofuran by concentration in vacuo to a volume of about 10 cc., and the remaining suspension is exhaustively extracted with benzene. The benzolic extracts are washed with a small amount of water, dried over sodium sulphate and evaporated in vacuo. Recrystallization of the residue from methylene chloride+ether yields 146 mg. of d:l-$\Delta^5$-3:3;20:20-bisethylenedioxy - 11 - oxo - 18:21 - diacetoxy-pregnene melting at 160.5–162.5° C.

532.6 mg. of d:l - $\Delta^5$-3:3:20:20 - bisethylenedioxy-11-oxo-18:21-diacetoxy-pregnene are dissolved in 100 cc. of a molar mixture of perchloric acid dihydrate and glacial acetic acid. The mixture is kept for 6 hours at room temperature, treated with 100 cc. of 1.5 N-aqueous sodium acetate solution, and then evaporated almost to dryness in an oil-pump vacuum. The residue is treated with water and extracted with methylene chloride, the extract is washed with 0.2 N-sodium bicarbonate solution and with 2.5-molar sodium chloride solution, dried with sodium sulphate, the drying agent is filtered off, and the filtrate is concentrated in vacuo. The concentrate is diluted with a small amount of tetrahydrofuran and then freed from methylene chloride with the use of ether as entraining medium. When the ethereal solution, which contains only little residual tetrahydrofuran, is allowed to stand for some time, 335.7 mg. of d:l-$\Delta^4$-3:11:20-trioxo-18:21-diacetoxy-pregnene, melting at 172 to 174° C., separate out.

A suspension of 111.2 mg. of d:l-$\Delta^4$-3:11:20-trioxo-18:21-diacetoxy-pregnene in 25 cc. of a 0.1 N-solution of potassium bicarbonate in aqueous methanol of 80% strength is agitated until the starting material has dissolved and then kept in the dark. After having been kept for 6 hours, the reaction mixture is treated with 4 cc. of 0.5 N-acetic acid, and 2 cc. of water, the mixture is freed in vacuo from methanol, and the aqueous residue is saturated with sodium chloride and extracted with methylene chloride. The extracts are washed with 4-molar sodium chloride solution, combined, dried with sodium sulphate and evaporated. The residue is dissolved in a mixture of acetone and ether (about 1:9), the solution is kept for 4 hours, a small amount of an originally precipitated sparingly soluble by-product is filtered off, and the whole is then kept for 5 days at 0° C. Yield: 62.2 mg. of a crystalline crude product and 37.0 mg. of amorphous mother liquor. For purification the crystallisate is dissolved in 4 cc. of methylene chloride, and the solution is chromatographed on 40 sheets of whatman paper No. 1 (size: 18.5 x 45 cm.) "down to the bottom" in the Bush system $B1_1$ at 38°. The zone of $R_f=0.48$ to 0.65, localized with the aid of ultraviolet absorption, is successively eluted with a total of 770 cc. of aqueous tetrahydrofuran of 20% strength, 300 cc. of 50% strength and with 150 cc. of undiluted tetrahydrofuran, and the combined extracts are concentrated in vacuo to a volume of about 10 cc. The concentrate is exhaustively eluted with benzene, and the extract is washed with 4-molar sodium chloride solution, dried over sodium sulphate, concentrated in vacuo, and the concentrate is filtered through a column of 200 mg. of active carbon prepared with benzene. The filtrate is evaporated in vacuo, and the residue is dissolved in a small amount of methylene chloride and diluted with ether. The ethereal solution is freed from methylene chloride and evaporated, to yield on standing 32.0 mg. of crystalline d:l - $\Delta^4$ - 3:11:20-trioxo-18-acetoxy-21-hydroxy-pregnene melting at 151.5–153.5° C. The mother liquor of the crude product is subjected to analogous paperchromatographic separation, to yield another 6.25 mg. of the pure monoacetate.

10.06 mg. of d:l-$\Delta^4$-3:11:20-trioxo-18-acetoxy-21-hydroxy-pregnene and 1 cc. of 0.1 N-potassium carbonate solution in aqueous methanol of 80% strength are agitated under nitrogen for 20 minutes at room temperature. The reaction mixture is then cooled in ice-cold water, a few small grains of solid carbon dioxide are added, and the whole is evaporated to dryness in vacuo. The residue is mixed with 90 mg. of sodium sulphate, filtered and then extracted with a total of 2.5 cc. of methylene chloride. The extract is concentrated and chromatographed at 38° in the Bush system $B1_1$ "down to the bottom" on 5 sheets of whatman paper No. 1 (size: 18.5 x 45 cm.; previously washed with chloroform and methanol). The ultraviolet-absorbing main zone of $R_f=$ 0.08 to 0.18 is eluted with a total of 100 cc. of methanol, evaporation of the methanolic solution in vacuo, extraction of the residue spread over a large surface with a total of 20 cc. of benzene, filtration and evaporation of the collected extracts under reduced pressure yields a colorless, viscid oil which is immediately taken up in a small amount of acetone. Addition of ether yields a first crystalline fraction of 5.85 mg. of d:l-$\Delta^4$-3:11:20-trioxo-18:21-dihydroxy-pregnene, or respectively its 20-cyclosemiketal, melting at 159.5–162° C. Further concentration of the mother liquor produces another 1.75 mg. of the same compound melting at 156 to 159° C.

The d:l - $\Delta^4$ - 3:11:20-trioxo-18:21-diacetoxy pregnene formed in the above example as an intermediate can alternatively be prepared by oxidizing the d:l-$\Delta^4$-3:20-dioxo-11$\beta$-hydroxy-18:21-diacetoxy - pregnene described in Example 1.

In the course of 1½ hours 4.50 mg. of d:l-$\Delta^4$-3:20-dioxo-11$\beta$-hydroxy-18:21-diacetoxy-pregnene in 0.2 cc. of glacial acetic acid are treated with 0.30 cc. of a solution of chromic oxide in glacial acetic acid, which solution is 0.0415-normal calculated on oxygen, and after a reaction time of 2¼ hours 5 mm.³ of methanol are added. After another hour the whole is evaporated in an oil-pump vacuum to syrup consistency, the residue is treated with water and then extracted with methylene chloride, and the extracts are successively agitated ice-cold with 0.5 N-sulphuric acid, 0.5 N-sodium bicarbonate solution and with water, dried with sodium sulphate and evaporated. On crystallization from a 1:19 mixture of tetrahydrofuran and ether, the residue yields 3.65 mg. of d:l-$\Delta^4$-3:11:20-trioxo - 18:21 - diacetoxy-pregnene melting at 169–171.5° C.

4.0 mg. of the above described d:l-$\Delta^4$-3:11:20-trioxo-18-acetoxy-21-hydroxy-pregnene are dissolved in 0.05 cc. of pyridine and 0.1 cc. of acetic anhydride. After being allowed to stand for 14 hours at 25° C. the reaction mixture is evaporated in a high vacuum using toluene as entraining agent, the retained toluene removed by taking up the residue in tetrahydrofuran and renewed evaporation in vacuo, and the syrupy concentrate finally diluted with a little ether. On being allowed to stand, 3.9 mg. of d:l-$\Delta^4$-3:11:20-trioxo-18:21-diacetoxy-pregnene with M.P. 166.5–170° C. precipitate.

44.4 mg. of d:l-$\Delta^4$-3:11:20-trioxo-18:21-diacetoxy-pregnene and 4.0 cc. of 0.1 N-potassium carbonate in aqueous methanol of 80% strength are agitated for 20 minutes at 25° C. in a nitrogen atmosphere, any excess carbonate is then converted into hydrogen carbonate by the addition of a little solid carbonic acid, and the solution evaporated in a high vacuum. 375 mg. of anhydrous sodium sulphate are added to the residue which is extracted with 2.5 cc. of tetrahydrofuran and a total of 6 cc. of a mixture of tetrahydrofuran and ether (1:2), the extract is decolorized on 25 mg. of active carbon and the filtrate evaporated in vacuo to the consistency of syrup. From the concentrate cautiously diluted with ether there precipitate on standing 28.9 mg. of d:1-$\Delta^4$-3:11:20-trioxo-18:21-dihydroxy-pregnene or its 20-cyclosemiketal melting at 157.5–159° C. Hydrolysis of the mother liquors (15.8 mg.) as described above yields another 7.2 mg. of crystals of the same purity.

21.9 mg. of d:1-$\Delta^4$-3:11:20-trioxo-18:21-dihydroxy-pregnene or its 20-cyclosemiketal are dissolved in 0.25 cc. of pyridine and acetylated with 0.29 cc. of acetic anhydride at 20° C. After being left to stand for 62 hours the reaction mixture is evaporated in a high vacuum using toluene as entraining agent, the residue is dissolved in 1.0 cc. of tetrahydrofuran and chromatographed "down to the bottom" on 10 sheets of whatman paper No. 1 (size: 18.5 x 45 cm.; previously washed with methanol and chloroform) saturated with formamide, in the solvent system formamide/benzene. The ultraviolet-absorbing zone of $R_f$-value 0.32–0.43 is dried for 16 hours under 0.1 mm. pressure of mercury, the paper is then eluted in succession with aqueous tetrahydrofuran of 20% strength, aqueous tetrahydrofuran of 50% strength and tetrahydrofuran of 100% strength. The combined extracts are concentrated in vacuo to a volume of about 5 cc., and the aqueous residue is extracted with benzene after being saturated with sodium chloride. The extract is washed with 4 N-sodium chloride solution, dried with sodium sulphate and extensively evaporated in vacuo, the concentrate decolorized with 40 mg. of active carbon and then completely evaporated. By crystallization from a mixture of tetrahydrofuran and ether there are obtained a total of 6.8 mg. of d:1-$\Delta^4$-3:11:20-trioxo-18-hydroxy-21-acetoxy-pregnene or its 20-cyclosemiketal melting at 169.5–172.5° C. and of double melting point 146°/162–170.5° C. respectively (metastable modification).

The ultraviolet-absorbing zone of $R_f$-value 0.69–0.78 of the chromatogram obtained in the preceding paragraph is eluted as described above for the top zone and in this way 2.6 mg. of pure d:1-$\Delta^4$-3:11:20-trioxo-18:21-diacetoxy-pregnene are obtained (cf. above). By analogous elution of the most rapidly travelling ultraviolet-absorbing zone of $R_f$-value 0.83–0.93 there is obtained pure d:1-$\Delta^4$-3:11-dioxo-18:20 - oxido - 20:21-diacetoxy-pregnene.

*Example 3*

1.088 grams of d:1 - $\Delta^5$ - 3:3;20:20-bisethylenedioxy-11$\beta$:18:21 - trihydroxy - pregnene are acetylated as described in the first paragraph of Example 1, and the reaction product is separated paper-chromatographically as described in that Example. Elution of the zone of $R_f$=0.73 to 0.85 yields 260 mg. of a crystalline substance which is dissolved in 12 cc. of benzene; the solution is filtered through a column of 260 mg. of active carbon, and the colorless filtrate is evaporated in vacuo. Recrystallization of the residue from acetone+ether yields 178.8 mg. of d:1-$\Delta^5$-3:3;20:20-bisethylenedioxy-11$\beta$:21-diacetoxy-18-hydroxy-pregnene melting at 197.5–199.5° C.

A solution of 107 mg. of d:1-$\Delta^5$-3:3;20:20-bisethylenedioxy-11$\beta$:21-diacetoxy-18-hydroxy-pregnene in 20 cc. of acetic acid of 75% strength is kept for 140 hours at room temperature. The reaction mixture is then evaporated in an oil pump vacuum, and the retained volatile matter is removed by repeated dissolution in toluene and renewed evaporation. A methylene chloride solution of the residue is chromatographed "down to the bottom" on 50 sheets of whatman paper No. 1 (size: 18.5 x 45 cm.; previously washed with chloroform and methanol), saturated with formamide, in the system formamide/cyclohexane-benzene (1:1). The ultraviolet-absorbing zone of $R_f$=0.68 to 0.78 is freed from formamide by being dried for 16 hours at 40° C. in a high vacuum and then eluted with 1000 cc. of aqueous tetrahydrofuran of 20% strength.

The extract is concentrated in vacuo to a volume of about 10 cc., and the aqueous residue is exhaustively extracted with benzene. The benzolic extracts are washed with a small amount of water and dried with sodium sulphate, evaporated in vacuo, and the residue yields from ether 19.5 mg. of d:1-$\Delta^4$-3-oxo-11$\beta$:21-diacetoxy-18-hydroxy-20:20-ethylenedioxy-pregnene melting at 207–209° C.

A solution of 12.26 mg. of d:1-$\Delta^4$-3-oxo-11$\beta$:21-diacetoxy-18-hydroxy-20:20-ethylenedioxy-pregnene in 0.5 cc. of pyridine is treated with 1.0 cc. of a 0.2-molar solution of chromium trioxide in pyridine, and the mixture is stirred for 20 hours at room temperature. The pyridine is then almost completely removed in an oil-pump vacuum, and the residue is extracted by being repeatedly triturated with methylene chloride. The extracts are freed from the insoluble inorganic matter and washed ice-cold with 0.5 N-phosphoric acid, 0.5 N-sodium bicarbonate solution and water, dried with sodium sulphate and evaporated. To purify the residue it is dissolved in 5 cc. of tetrahydrofuran, the solution is filtered through a column of 100 mg. of active carbon, and the filtrate is evaporated in vacuo. The resulting crude d:1-$\Delta^4$-3:18-dioxo - 11$\beta$:21-diacetoxy-20:20-ethylenedioxy-pregnene is hydrolysed by being covered with 5 cc. of a 0.2-molar solution of potassium carbonate in methanol of 80% strength, the mixture being shaken for 18 hours at room temperature, then cooled in ice-cold water, a few grains of solid carbon dioxide are added, the mixture is diluted with 1 cc. of water, and the methanol is distilled off in vacuo. The aqueous residue is extracted with methylene chloride, and the extract is washed with 4-molar sodium chloride solution, dried with sodium sulphate and evaporated in vacuo. The resulting crude 18-cyclo-semiacetal of d:1-$\Delta^4$-3:18-dioxo-11$\beta$:21-dihydroxy-20:20-ethylenedioxy-pregnene is acetylated in 0.20 cc. of pyridine with 0.12 cc. of acetanhydride for 40 hours at room temperature, the reaction mixture is evaporated in an oil-pump vacuum, and the retained reagent is distilled off in vacuo with the aid of toluene as entraining agent. To bring about ketal cleavage the resulting crude acetylation product is dissolved in 1.25 cc. of acetic acid of 90% strength, and the solution is kept at a gentle boil for 20 minutes in a bath heated at 125° C., again evaporated in an oil-pump vacuum, the retained acetic acid is removed by distillation with toluene, the residue is dissoved in 0.5 cc. of methylene chloride and this solution is chromatographed on 5 sheets of whatman paper No. 1 (size: 18.5 x 45 cm.; previously washed with chloroform and methanol), saturated with formamide, in the system formamide/cyclohexane-benzene (1:2). The chromatogramme is allowed to "run down to the bottom" and from it the ultraviolet-absorbing zone of $R_f$=0.08–0.12 is eluated with 80 cc. of aqueous tetrahydrofuran of 20% strength and 40 cc. of 50% strength, the extracts are combined, concentrated in vacuo to a volume of about 2.5 cc., and the aqueous concentrate is saturated with sodium chloride and extracted with methylene chloride. The extracts are washed with 4-molar sodium chloride solution, dried with sodium sulphate and evaporated. The yellowish residue crystallises from acetone+ether, to yield 1.2 mg. of the 18-cyclosemiacetal of d:1-$\Delta^4$-3:18:20-trioxo-11$\beta$-hydroxy-21-acetoxy-pregnene melting at 178 to 180° C.

Crude d:1-$\Delta^4$-3:18-dioxo-11$\beta$:21-diacetoxy-20:20-ethylenedioxy-pregnene obtained from 24.5 mg. of d:1-$\Delta^4$-3-oxo - 11$\beta$:21-diacetoxy-18-hydroxy-20:20-ethylenedioxy-pregnene as described in the third paragraph of this Example is dissolved in 2.5 cc. of a mixture of glacial acetic acid and perchloric acid dihydrate, the latter being present in the proportion of 1 mol, and the whole is stirred for 1 hour at room temperature. The reaction mixture is then treated at 0–3° C. with 3.0 cc. of a 1-molar solution of potassium acetate in glacial acetic acid and the acetic acid almost completely distilled off at an oil pump. The residue is diluted with water, extracted with methylene chloride, the extract washed with 0.5 N-sodium carbonate and water, dried with sodium sulphate and evaporated in vacuo to yield an oily crude product. By preparative paperchromatographic separation and elution in an analogous manner to that described in the second paragraph of this example there is obtained pure d:l-$\Delta^4$-3:18:20-trioxo-11$\beta$:21-diacetoxy-pregnene.

11.1 mg. of d:l-$\Delta^4$-3:18:20-trioxo-11$\beta$-21-diacetoxy-pregnene are covered with 2.5 cc. of an 0.1 N-solution of potassium bicarbonate in aqueous methanol of 80% strength and the whole is agitated for 6 hours at room temperature. The resulting solution is then treated ice-cold with 1.0 cc. of 0.2 N-acetic acid, the methanol is distilled off in vacuo and the aqueous residue extracted with methylene chloride. The extracts are washed with 4 N-sodium chloride solution, dried with sodium sulphate filtered and the combined portions evaporated. The residue yields pure d:l-$\Delta^4$-3:18:20-trioxo-11$\beta$-acetoxy-21-hydroxy-pregnene or its 18-cyclosemiacetal after preparative paperchromatographic separation and elution in the manner described in the third paragraph of Example 2.

0.10 cc. of acetic anhydride is added to a solution of 4.0 mg. of d:l-$\Delta^4$-3:18:20-trioxo-11$\beta$-acetoxy-21-hydroxy-pregnene or its 18-cyclosemiacetal in 0.085 cc. of anhydrous pyridine and the whole is allowed to stand for 86 hours at room temperature. The reaction mixture is then evaporated in a high vacuum using toluene as entraining agent, and the remaining crude product purified by being subjected to paper chromatography. By working up in an analogous manner to that described in the penultimate paragraph of Example 2 there is obtained pure d:l - $\Delta^4$-3:20-dioxo-11$\beta$:18-diacetoxy-18:21-oxido-pregnene.

*Example 4*

1.088 grams of d:1 - $\Delta^5$-3:3;20:20-bisethylenedioxy-11$\beta$:18:21-trihydroxy-pregnene are acetylated as described in the first paragraph of Example 1, and the reaction product is separated by paper-chromatography as described in that example. Elution of the zone of $R_f=$ 0.32 to 0.48 yields 162.5 mg. of a crystalline substance which is purified by dissolution in 4 cc. of methylene chloride; the solution is chromatographed on 40 sheets of whatman paper No. 1 (size: 18.5 x 45 cm.; previously washed in chloroform and methanol) in the Bush system $B_3$ at 38° "down to the bottom." Elution of the zone of $R_f=0.525$ to 0.715 with 540 cc. of aqueous tetrahydrofuran of 20% strength, 200 of 50% strength and 100 cc. of undiluted tetrahydrofuran, evaporation of the combined extracts in vacuo, concentrating the aqueous residue to about 20 cc. and extracting the concentrate with benzene, washing the benzolic extract with a small amount of 2.5-molar sodium chloride solution, drying with sodium sulphate, evaporation and crystallization from a small amount of ether, yields 50.5 mg. of d:l-$\Delta^5$-3:3;20:20 - bisethylenedioxy - 11$\beta$:18-dihydroxy-21-acetoxy-pregnene melting at 148.5 to 151° C.

A solution of 24.63 mg. of d:l-$\Delta^6$-3:3;20:20-bisethylenedioxy-11$\beta$:18-dihydroxy-21-acetoxy-pregnene in 0.5 cc. of pyridine is mixed with 1.25 cc. of a 0.2-molar solution of chromium trioxide in pyridine, and the whole is stirred for 20 hours at room temperature. The pyridine is then distilled off almost completely in an oil-pump vacuum and the residue is extracted by repeated trituration with methylene chloride. The exrtacts are freed from the insoluble inorganic matter and the filtrate is washed ice-cold with 0.5 N-phosphoric acid, 0.5 N-sodium bicarbonate solution and water, dried with sodium sulphate and evaporated. To purify the residue it is dissolved in 5 cc. of tetrahydrofuran, the solution is filtered through a column of 100 mg. of active carbon, and the filtrate is evaporated in vacuo. The resulting crude d:l-$\Delta^5$-3:3;20:20-bisethylenedioxy - 11:18 - dioxo-21-acetoxy-pregnene is de-ketalized by being dissolved in 2 cc. of a molar mixture of perchloric acid dihydrate and glacial acetic acid, and the whole is kept for 10 minutes, then treated with 1.5 cc. of 2 N-sodium acetate solution while being cooled with ice-cold water, and the mixture is evaporated almost to dryness in an oil-pump vacuum. The residue is then distributed between water and methylene chloride, the methylene chloride extract is washed ice-cold with 0.5 N-sodium bicarbonate solution and a 2.5-molar solution of sodium chloride, dried with sodium sulphate and evaporated in vacuo. The residue is crude d:l-$\Delta^4$-3:11:18:20-tetraoxo-21-acetoxy-pregnene which is subjected as it is to an alkaline hydrolysis. For this purpose the residue is dissolved in 4.5 cc. of methanol of 90% strength, 0.5 cc. of a 0.1 N-solution of potassium carbonate in methanol of 90% strength is added, the reagent is allowed to act for 3 minutes, and a piece of solid carbon dioxide of the size of a grain of millet is added. The reaction mixture is completely evaporated in an oil-pump vacuum, the residue is treated with 150 mg. of sodium sulphate and repeatedly extracted with methylene chloride, and the filtered extracts are concentrated to a volume of 2.0 cc. The concentrate is chromatographed on 20 sheets of whatman paper No. 1 (size: 18.5 x 45 cm.; previously washed with chloroform and methanol), saturated with formamide, at 38° "down to the bottom" in the system formamide/benzene-chloroform (1:2). The sheets are dried for 14 hours in air and the ultraviolet-absorbing zone of $R_f=0.40$ to 0.55 is successively eluted with 200 cc. of aqueous tetrahydrofuran of 20% strength, 100 cc. of 50% strength and with 50 cc. of undiluted tetrahydrofuran. The combined extracts are concentrated in vacuo to a volume of 5 cc., and the aqueous residue is saturated with sodium chloride and exhaustively extracted with benzene. The benzolic extracts are washed with a small amount of 4 molar sodium chloride solution, dried with sodium sulphate and evaporated in vacuo. The residue is dissolved in 1.25 cc. of tetrahydrofuran, the solution is filtered through a column of 25 mg. of active carbon, and the filtrate is concentrated in vacuo to syrup consistency. When the concentrate is treated with a small amount of ether and allowed to stand for some time, 1.4 mg. of the 18-cyclosemiacetal of d:l-$\Delta^4$-3:11:18:20-tetraoxo-21-hydroxy-pregnene, melting at 194.5 to 197.5° C., crystallise out.

*Example 5*

18.42 mg. of d:l - $\Delta^5$-3:3;20:20 - bisethylenedioxy-11$\beta$:18:21-trihydroxy-pregnene are covered in a current of dry nitrogen with 1 cc. of benzene and 0.085 cc. of anhydrous pyridine, and while stirring and cooling the mixture with ice-cold water, it is treated within 10 minutes with 0.35 cc. of trifluoracetanhydride. The whole is stirred for 6 hours at room temperature, and the reaction mixture is poured and flushed with 2.5 cc. of ice-cold water into 2.5 cc. of 2 N-sodium carbonate solution and 5 grams of ice, and the mixture is agitated with benzene. The extracts are washed with 1.5 N-phosphoric acid, N-sodium bicarbonate solution and with water, the combined benzolic solutions are dried with sodium sulphate and evaporated under reduced pressure. On crystallization from ether+petroleum ether the residue yields 19.34 mg. of d:l-$\Delta^5$-3:3;20:20-bisethylenedioxy-11$\beta$:18:21-tris-trifluoracetoxy-pregnene melting att 181.5 to 185° C.

5.25 mg. of d:1 - $\Delta^5$ - 3:3;20:20 - bisethylenedioxy-11$\beta$:18:21-tris-trifluoracetoxy-pregnene are dissolved in 0.5 cc. of a 1-molar mixture of perchloric acid dihydrate and trifluoracetic acid, the solution is kept for 10 minutes in the dark, the reaction mixture is cooled with ice-cold water and neutralized with 0.7 cc. of a 1-molar solution of sodium trifluoracetate in trifluoracetic acid, and the whole is lyophilized in a high vacuum. The solid residue is flushed with 2.5 cc. of ice-cold water and 5 cc. of benzene into a separating funnel containing 2.5 cc. of 0.5 N-sodium bicarbonate solution, 2 grams of ice and 585 mg. of finely powdered sodium chloride. The whole is agitated, the aqueous phase is separated and extracted 3 times with 2.5 cc. each of benzene, the benzolic extracts are washed with 0.5 N-sodium bicarbonate solution and 4 molar sodium chloride, the combined benzolic solutions are dried with sodium sulphate and evaporated in vacuo. Crystallization of the residue from ether+petroleum ether yields 4.06 mg. of d:l-Δ⁴-3:20-dioxo-11β:18:21-tris-trifluoroacetoxy-pregnene melting at 188 to 191.5° C.

What is claimed is:

1. Process for the manufacture of saturated and unsaturated 3-oxygenated 20-oxo-pregnane compounds which contain in each of the positions 11 and 18 a member selected from the group consisting of a free, an esterified hydroxyl group and an oxo group and in the 21-position a member selected from the group consisting of a free and an esterified hydroxyl group, wherein, in a 20-ketal of a compound selected from the group consisting of a saturated and an unsaturated 3-oxygenated 11:18:21-trihydroxy-20-oxo-pregnane compound, (1) at least one of the hydroxyl groups is esterified, and (2) the ketal group in 20-position hydrolized by reaction with a strong inorganic acid in the presence of an aliphatic carboxylic acid of low molecular weight.

2. Process as claimed in claim 1, wherein the hydrolysis of the 20-ketal group is carried out with perchloric acid in the presence of a carboxylic acid of low molecular weight.

References Cited in the file of this patent

UNITED STATES PATENTS

| | | |
|---|---|---|
| 2,838,501 | Campbell et al. | June 10, 1958 |
| 2,862,925 | Reichstein et al. | Dec. 2, 1958 |
| 2,904,545 | Reichstein et al. | Sept. 15, 1959 |
| 2,986,567 | Reichstein et al. | May 30, 1961 |